United States Patent [19]

Pett et al.

[11] 4,158,689

[45] Jun. 19, 1979

[54] MOLDING PARTICULATE SOLIDS AND SACRIFICIAL BINDERS THEREFOR

[75] Inventors: Robert A. Pett, Franklin; V. Durga Nageswar Rao, Bloomfield Township, Oakland County; S. Burhan A. Qaderi, Westland, all of Mich.

[73] Assignee: Ford Motor Company, Dearborn, Mich.

[21] Appl. No.: 810,464

[22] Filed: Jun. 27, 1977

Related U.S. Application Data

[63] Continuation-in-part of Ser. No. 644,779, Jan. 7, 1976, abandoned.

[51] Int. Cl.² ............................................. C04B 35/64
[52] U.S. Cl. .................................. 264/63; 260/28.5 R; 260/33.6 AQ; 260/42.11; 264/126; 264/332
[58] Field of Search .................................. 264/43–44, 264/63, 126, 332; 260/28.5 R, 33.6 AQ, 42.11; 164/21, 43

[56] References Cited

U.S. PATENT DOCUMENTS

| | | | |
|---|---|---|---|
| 3,330,892 | 7/1967 | Herrmann | 264/63 |
| 3,472,803 | 10/1969 | Andrews et al. | 264/63 |
| 3,477,148 | 11/1969 | Martin | 36/98 |
| 3,501,855 | 3/1970 | Himes | 36/98 |
| 3,787,531 | 1/1974 | Dahlquist et al. | 260/27 BE |
| 3,794,707 | 2/1974 | O'Neill et al. | 264/63 |
| 3,911,040 | 10/1975 | Lundsager | 260/42.11 |
| 3,985,702 | 10/1976 | Himes | 260/33.6 AQ |

OTHER PUBLICATIONS

Rubber Technology—"Thermoplastic Elastomers'"—Hendricks et al.—2nd Edit.—pp. 515–533, Van Nostrand Co., New York, N.Y.—1973.

*Primary Examiner*—Jeffery R. Thurlow
*Attorney, Agent, or Firm*—Edmund C. Moss, Jr.; Olin B. Johnson

[57] ABSTRACT

Improvements in molded articles from sinterable particulate solids, improvements in method for making such articles, and novel sacrificial binders for use in making such articles are disclosed. The sacrificial binders used in this invention comprise block polymers having the structural formula

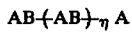

wherein "$\eta$" is 0 or a positive integer, "A" is a linear or branched polymer that is glassy or crystalline at room temperature and has its softening point in the range of about 80° C. to about 250° C. and "B" is a polymer different from A that behaves as an elastomer at processing temperatures, a plasticizer which may be oil, wax, or oil and wax, and optionally other components.

11 Claims, No Drawings

MOLDING PARTICULATE SOLIDS AND SACRIFICIAL BINDERS THEREFOR

THE INVENTION

This application is a continuation-in-part of U.S. Ser. No. 644,779 filed Jan. 7, 1976, now abandoned.

This invention relates to improved molded articles from sintered particulate solids and to methods and materials for producing articles from particulate materials which exhibit unusual physical integrity in the green body stage and unusual dimensional precision as final products, i.e., after "burn-out" and sintering. In particular, this invention is concerned with articles produced by mixing particulate solids with a thermoplastic, sacrificial-binder material, molding the article into its green body configuration, burning out the sacrificial-binder material and sintering the particulate solids into a single solid mass, with methods for making such articles and to unique sacrificial binders for use in making such articles. This invention is applicable to all particulate solids which are sinterable, as that term is hereinafter defined.

The sacrificial binders of this invention are thermoplastic and contain as the principal binder resin a theromplastic, rubber-related, block polymer having the physical properties hereinafter delineated, and the structural formula AB—AB—$_\eta$ A, wherein "$\eta$" is 0 or a positive integer, "A" is a linear or branched polymer that is glassy or crystalline at room temperature and has its softening point in the range of about 80° C. to about 250° C. and "B" is a polymer different in chemical composition from A that behaves as an elastomer at processing temperatures. A detailed description of block polymers, their preparation, composition and physical properties are to be found in "Synthesis of Block Polymers by Homogeneous Anionic Polymerization" by L. J. Fetters, Institute of Polymer Science, The University of Akron, Akron, Ohio published in the Journal of Polymer Science, Part C, No. 26, pages 1–35 (1969) and "Rubber-Related Polymers, I. Thermoplastic Elastomers" by W. R. Hendricks and R. J. Enders, Elastomers Technical Center, Shell Development Company, Torrance, California, published in Rubber Technology, Second Edition, Chapter 20, pages 515–533, by Van Nostrand Reinhold Company, New York, Cincinnati, Toronto, London and Melbourne (1973), which are incorporated herein by reference. For the details of vacuum apparatus and method for performing anionic initiated polymerizations which can be used to produce block polymers, see "Procedures for Homogeneous Anionic Polymerization" by Lewis J. Fetters, Journal of Research of the National Bureau of Standards, Vol. 70A, No. 5, September-October 1966, pages 421–433 and "The Association of Polystyryllithium, Polyisoprenyllithium, and Polybutadienyllithium in Hydrocarbon Solvents," by Maurice Morton, Lewis J. Fetters, R. A. Pett, and J. F. Meier, Institute of Polymer Science, published in Macromolecules, Vol. 3, pages 327–332, by the American Chemical Society (1970) which are herein incorporated by reference.

Basically, the concept here involved provides for making sintered articles from particulate solids employing sacrificial binders which behave as thermoplastics during the processing, i.e., mixing and molding, in that they flow readily at the temperature used for these operations and yet behave in the nature of thermosets during storage of the green body at room temperature and during firing until the sintered body has taken permanent form. This is achieved with the block polymer elastomers hereinbefore and hereinafter more fully described and the oil or wax or oil and wax used as plasticizer. The oil serves to aid in processing by reducing the viscosity of the elastomer which is of particular importance during the application of shear forces at mixing and molding temperatures. Thus, when the temperature of the material is raised above the glass transition temperature of the block polymer elastomer, i.e., the glass transition temperature of the "A" segments of the block polymer, and shear forces are applied, the material becomes less viscous and flows like a thermoplastic. When the system is cooled to room temperature after forming, the "A" segments, e.g., polystyrene, tend to agglomerate to form "domains" and provide a structure similar in physical behavior to a crosslinked polymer. Subsequent firing at a higher temperature drives off the oil and/or wax. As no applied shear forces are present during firing, the "A" segment domains remain in their agglomerated form, thus maintaining the shape of the green body through burn-out and such shape is maintained through sintering by the integrity of the structure of the residual particulate solids.

DETAILED DESCRIPTION OF THE INVENTION

A. The Principal Binder Resin

The principal binder resin is a thermoplastic block polymer having the structural formula AB—AB—$_\eta$ A wherein "$\eta$" is 0 or a positive integer and "A" and "B" are different polymers. This block polymer advantageously comprises in excess of 50 wt. % of polymeric material in the binder excluding the oil and/or wax of the plasticizer. For purposes of simplicity, these polymers will be primarily discussed with reference to their most simple form wherein "$\eta$" is 0, i.e., a block polymer of the structural formula A—B—A. It is to be understood that the statements made about these triblock polymers apply equally to those block polymers wherein "$\eta$" is one (1) or greater even though certain of the "A" segments will not be terminal and certain of the "B" segments will not be center segments.

The "A" segments of these block polymers are non-crosslinked, linear or branched polymers which are glassy or crystalline at room temperature and have their softening point in the range of about 80° C. to about 250° C. When the molded article is in the green body stage, i.e., after formation and prior to burn-out of the sacrificial binder, and at room temperature, i.e., 20°–25° C., the "A" segments exhibit a modulus greater than $10^9$ dynes/cm$^2$. Where the block polymers are prepared by anionic polymerization, suitable materials for the "A" segments inlude, but not by way of limitation as one skilled in the art will recognize from the physical and chemical characteristics of these and similar polymers, polystyrene, poly(acrylonitrile), poly(p-bromostyrene), poly(methyl methacrylate), poly(alphamethylstyrene), poly(2-methyl-5-vinylpyridine) and poly(4-vinylpyridine). Other block polymers suitable for use in this invention are advantageously prepared by other synthesis routes, i.e., polycondensation, free radical initiated polymerization and cationic polymerization using techniques known to the art. When these other syntheses are employed, suitable materials for the "A" segments include, but not by way of limitation as one skilled in the art will recognize from the physical and chemical characteristics of these and similar polymers, poly(vinyl acetate), polyesters, polyamides, polyurethanes, poly(vinyl chloride), polypropylene, polysulfones, poly(phenylene sulfide), poly(4- methyl pentene-1) and poly(vinyl alcohol).

The "B" segment of these A—B—A polymers are either rubbery, flexible, glassy or crystalline polymers, as those terms are hereinafter defined, and behave as elastomers at processing temperatures. The "B" segment may be linear or branched and in some embodiments is chemically crosslinkable. In such embodiments, a crosslinking agent therefor is added during mixing and reacted on molding. When the molded article is in the green body stage and at room temperature, it exhibits a modulus of about $10^6$–$5 \times 10^7$ dynes/cm$^2$ when the "B" segment is a rubbery polymer. Where the "B" segment is a flexible polymer, at room temperature, this modulus will be in the range of about $10^7$–$10^9$ dynes/cm$^2$. Where the "B" segment is a glassy or crystalline polymer at room temperature, this modulus will be above about $10^9$ dynes/cm$^2$. Where the block polymers are prepared by anionic polymerization, suitable materials for the "B" segments include, but not by way of limitation as one skilled in the art will recognize from the physical and chemical characteristics of these and similar polymers, polybutadiene, polyisoprene, polydimethylbutadiene, poly(ethylene oxide), poly(isopropyl acrylate), poly(octamethylcyclotetrasiloxane), and poly(tetrahydrofuran). As aforementioned, block polymers suitable for use in this invention are advantageously prepared by other synthesis routes, i.e., polycondensation, free radical initiated polymerization and cationic polymerization. When these other syntheses are employed, suitable materials for the "B" segments include, but not by way of limitation as one skilled in the art will recognize from the physical and chemical characteristics of these and similar polymers polyisobutylene, ethylene propylene rubber, ethylene propylene diene terpolymers, butyl rubber, chlorobutyl rubber, bromobutyl rubber, chlorosulfonated polyethylene, epichlorohydrin rubber, fluorocarbon rubbers, silicone elastomers, e.g., polydimethylsiloxane, polyurethane elastomers and polypropylene oxide elastomers.

The molecular weights of the "A" segments and the "B" segments of the block polymers suitable for use with this invention will vary with the polymer segment involved as will be obvious to one skilled in the art in that physical characteristics must be met as hereinbefore recited. For instance, where the block polymer has polystyrene "A" blocks and polybutadiene "B" blocks, the polystyrene segments advantageously have molecular weights below about 20,000 and at least two of such segments have molecular weights above about 10,000 whereas the polybutadiene segment or segments advantageously have molecular weight or weights below about 80,000 and at least one such segment has molecular weight above about 40,000. The lower limit of molecular weight for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation or processing.

To mix the block polymer with either of the other components of the sacrificial binder or with the particulate solids, the block polymers must be heated to the softening point of the "A" segments or above. Once the block polymer has been mixed with the other components of the sacrificial binder, the oil and/or wax can serve as a plasticizer and permit subsequent working, e.g., molding, etc., at a temperature below the softening point of the "A" segments. The lower temperature limitations for such working will depend upon the chemical composition of the "A" segments, the degree to which they are plasticized and the plasticization qualities of the plasticizer. In all cases, however, the lower limit of the working temperatures for such binders will be above the temperature at which the "B" segments of the block polymers cease to behave as elastomers. In general, the mixing temperature is advantageously in the range between about 15° C. below the softening point of the "A" segments of block polymer used and about 70° C. above such softening point, except where mixing is carried out in the absence of gaseous oxygen in which case the temperature may be increased to about 100° C. above such softening point. Thus, the forming temperatures which may be used with the various suitable block polymers will vary between about 65° C. and about 320° C. or 350° C. in the absence of air or other gaseous oxygen. Forming, other than embossing, is carried out at temperatures above the softening point of the "A" segments. Embossing can be carried out at the same temperatures or even below the softening point of the "A" segments.

In the thermoplastic block polymers having the A—B—C structure, the end segments, "A", which are rigid at room temperature associate with each other to give large aggregates which are referred to in the literature as "domains". At normal handling temperature for the molded article after final forming of the green body stage, e.g., room temperature or slightly above, these domains are hard and immobilize the ends of the "B" segments. This end segment immobilization in conjunction with chain entanglements creates physical crosslinks which helps to protect the green body from disfiguration as the result of handling. At higher temperatures, the terminal, "A" segments soften and may be disrupted by applied stress, allowing the polymer to flow. The latter condition makes possible the mixing, molding, etc. which are necessary or optional steps in preparing the green body. Cooling will then provide a green body having unusual resistance to physical change prior to the heating associated with burn-out and sintering.

Although not essential, it can be advantageous, at least from a processing equipment standpoint, to maintain working temperatures during processing such that viscosity is as low as possible. In this regard, viscosity may reach a minimum at a certain temperature but then, upon elevation of temperature, undergoes a viscosity reversal such that the viscosity increases with increasing temperatures. Although dependent upon the nature and amount of the ingredients involved, the temperature of minimum viscosity in a processing may be ascertained beforehand using standard analytic viscosity-temperature measurement equipment. Desirably then, processing temperatures can be maintained to permit a minimum viscosity and thereby provide easier processing. Usually, for such processing expedience, it is desirable to provide for working temperatures near but not in great excess above the temperature which permits a desirable minimum viscosity e.g., no higher than 15° F. above the temperature for minimum viscosity, more desirably temperatures up to that temperature at which a viscosity reversal (i.e. increase in viscosity) occurs. It should be noted, however, that apparent viscosity may also show a time dependent behavior due to (a) thixotropic behavior and (b) irreversible thermally induced degradation. Further behavior typical of a psuedoplastic fluid is seen with distinct yield points characteristics of Bingham bodies.

B. The Plasticizer

The sacrificial binder also includes a plasticizer which is either an oil or a wax or both. The oils and waxes used for this purpose are naphthenic, paraffinic or a mixture of paraffinic and naphthenic constituents. They are sufficiently volatile to be reoved easily and rapidly in the burn-out process but insufficiently volatile to be substantially removed during mixing and/or molding. The loss due to volatilization during mixing and/or molding is advantageously below 20 and preferably below 10 weight percent.

Functionally, the oils and/or waxes must be compatible with the rubbery phase of the principal binder resin when it becomes rubbery on plasticization at a temperature somewhat below the softening point of the "A" segments of the principal resin. This gives the binder a capability of accepting high filler loadings while remaining strong and flexible.

At least 75% by weight of the oils used as plasticizers boil in the range of about 550° F. to about 1038° F., preferably in the range of about 550° F. to about 865° F. They have viscosities at 210° F. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have their Aniline Point in the range of about 170° F. to about 255° F. The oils may be a product of petroleum refining operations or vegetable or animal oils and they may include or be low molecular weight synthetic polymers such as polystyrene, poly(alpha-methyl styrene), or a polyolefin. Examples of suitable commercially available oils include Flexon 580, 680, 765 marketed by Exxon and Shellflex 131, 371 and 790 marketed by Shell Chemical Co.

The waxes used have melting points in the range of about 130° F. to about 170° F. At least about 75% by weight of such wax boils at temperatures in the range of about 600° F. to about 900° F. These may be a product of petroleum refining operations, vegetable or animal waxes or synthetic polymers such as low molecular weight polyolefins. Examples of suitable commercially available waxes include Sunoco Wax 3420, 4412 and 4410 marketed by Sun Chemical as well as Paraffin Wax (mp 130° F.) marketed by International Wax Refining.

C. Optional Constituents

The sacrificial binders of this invention may and in certain embodiments advantageously do contain additional materials such as supplementary resins, supplementary elastomers and antioxidants.

Supplementary resins are useful in embodiments where there is a desire to increase the stiffness of the green body while still providing fluidity at processing temperatures. Suitable secondary resins include any of the aforementioned polymers suitable for use as "A" segments in block polymers, resins similar to resins suitable for use as "A" segments and having affinity for the "A" segments of the block polymer used, e.g., cumarone-indene resins and polyindene with block polymers having polystyrene "A" blocks, and resins which have an affinity for the "B" segment or segments in the block polymers, e.g., polyterpenes with polybutadiene "B" blocks. It is to be understood that resins having an affinity for the "A" or "B" segments of the block polymer may also be polymers suitable for use as "A" or "B" respectively in other embodiments when they meet the limitations set forth herein for "A" or "B". Examples include Styron A and Styron B marketed by Dow Chemical Co. and Polymel DX-40, a polymerized modified polystyrene naphthenic resin.

Supplementary elastomers are useful in embodiments where there is a desire to improve tear strength in the green body. Suitable secondary elastomers include natural rubber (e.g. #IRSS) and synthetic elastomrs, e.g., polybutadiene, polyisoprene, etc. Supplementary fillers, e.g., carbon black, may be used in minor amoumts to increase the stiffness of the green body.

Antioxidants are useful to retard oxidative degradation of the block polymer during mixing thus minimizing loss of strength in the green body. The antioxidant alos allows more rapid removal of binder during burn-off by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetrakis [methylene-3-(3',5'-ditert-butyl-4'-hydroxyphenyl) propionate) methane, etc.

Process aids which are conventional to molding and forming operations with polymeric materials are likewise useful in the practice of this invention to improve the release characteristics of the green body from any type of molding or forming apparatus with which the green body comes in contact and to improve the flow characteristics of the binder-filler mixture during such operations as extrusion molding, injection molding, transfer molding, etc. Process aids which may be of assistance include methylacetylricinoleate, stearic acid, polyethylene, polyethylene wax, mixtures of natural waxes and wax derivatives, vegetable fats, partially oxidized polyethylene, etc.

D. Particulate Material

This invention is applicable to all particulate material that is "sinterable" as that term is hereinafter defined. Specific examples include, ceramic powders such as cordierite powders, alumina, B-spodumene, crystalline or fused silica, mullite, kyanite, zirconia, beryllia, magnesia, titania, chromium oxide, iron oxide and complex oxides comprising two or more of these oxides, metal powders such as iron, iron alloys, copper, copper alloys, aluminum, aluminum alloys, silicon, silicon alloys, nickel base super alloys, cobalt base super alloys and stainless steels, intermetallics such as nickel aluminides and molybdenum silicide, carbides such as silicon carbide, tungsten carbide, and iron carbide, nitrides such as silicon nitride and boron nitride and composites of metal-ceramics, metal carbides and metal nitrides. Advantageously, average particle diameters exceed 0.01 microns for powders and fibers (e.g. chopped magnesium aluminum silicate glass fibers) with length to diameter ratios exceeding 8 can also be advantageously employed as well as mixtures of these.

One of the advantages of these binders is that they are amenable to high fillings of particulate solids. The molding mixture advantageously comprises about 30 to about 70, preferably about 50 to about 65, volume percent particulate solids with the balance being made up to the sacrificial binders.

E. Proportions of Binder Constituents

The proportions of the principal binder resin or elastomer, i.e., the block polymer, and the plasticizer, i.e., the oil, wax or oil and wax, may vary widely. In a binder consisting solely of the block polymer and plasticizer, the block polymer will comprise between 10 and 90, preferably between about 30 and about 85, and most preferably between about 45 and about 65, weight percent of the total binder with the plasticizer comprising the balance, i.e., between 90 and 10, preferably between about 70 and about 15, and most preferably between about 55 and about 35 weight percent, provided, however, that the wax constituent when used, advantageously does not exceed about 70 weight percent of the binder.

It will be understood that one may replace any fraction less than 50 weight percent, i.e., 0 to between 49 and 50, more commonly between about 0.1 and about 30, weight percent of the block polymer aforedefined with an equivalent amount by weight of another (i.e., first replacement) polymer that is within the limitations of "A" in the aforementioned formula.

It will also be understood that one may replace any fraction less than 50 weight percent, i.e., 0 to between 49 and 50, more commonly between about 0.1 and about 30, weight percent of the aforedefined block polymer with an equivalent amount by weight of another (i.e., second replacement) polymer that is within the limitations of "B" in the aforementioned formula.

It will be further understood that one may replace any fraction less than 50 weight percent, i.e., 0 to between 49 and 50, more commonly between about 0.1 and about 40, weight percent of the block polymer aforedefined with an equivalent amount by weight of a block elastomer polymer having the structural formula X—B(AB)$\eta$ A]$\eta'$ wherein "X" is a linking group e.g., derived from a multifunctional halogen functional linking agent, "A" or "B", "$\eta$" is 0 or a positive integer, "$\eta'$" is a positive integer greater than 2 and "A" and "B" have generally the same limitations as "A" and "B" in the hereinbefore described block polymer having the structural formula AB—AB—$\eta$ A, except that "B" of said elastomer (or said second replacement) polymer desirably also behaves as an elastomer at temperatures between about 5° C. up to about 15° C. below the softening point of "A" of said block polymer aforedefined and about 90° C. above (desirably about 70° C.) the softening point of "A" of said block polymer aforedefined. The linking agent, when the block polymer is made with a linking agent, is a multifunctional (>2) compound consisting essentially of elements selected from the group consisting of carbon, hydrogen, oxygen, halogens, nitrogen, silicon, phosphorous and sulfur. When anionic polymerization is used, this is a halogen functional coupling species. The following are illustrative but not exhaustive: silicon tetrachloride, 1,2,4-tri(chloromethyl) benzene, 1,2,4,5-tetra(chloromethyl) benzene, Bis(trichlorosilyl)ethane, cyclic trimer of phosphonitrilic chloride, chloromethylated polystyrene, trichloromethylsilane. The use of these linking agents is discussed in the aforementioned article "Synthesis of Block Polymers by Homogeneous Anionic Polymerization" by L. J. Fetters. When the block polymers are prepared by other synthesis routes as aforementioned, one would use other linking agents. In the case of free radical polymerization, one may use a multifunctional compound that will initiate polymerization of the "B" block, as when the "B" block is poly(ethyl acrylate), and react with the "B" block, e.g., a branched azonitrile such as one prepared by reacting trimethylolpropane with a diisocyanate such as toluene diisocyanate and a glycol such as poly(oxypropylene glycol). In the case of polycondensation, one may use a multifunctional compound that will react with the "B" block, e.g., trimellitic anhydride. In the case of cationic polymerization, one may react poly(vinyl chloride) with trimethyl aluminum which will initiate polymerization of the "B" block, as when the "B" block is polyisobutylene, and react with the "B" block. As aforementioned, "X" may be polymer "A", polymer "B" or other linking group. For purposes of this invention and the use of such block polymers in sacrificial binders for a molding mixture, the substitution of a linking group for polymer "A" or polymer "B" as the "X" component does not materially affect the physical properties of the block polymer. Linking agents are conventionally used in making such block polymers and are well known to those skilled in the art as shown in the hereinbefore cited literature. With such teachings, selection of a specific linking agent for a specific block polymer is quite within the skill of those skilled in the art.

In combination the substitutions of such "A" type polymers, such "B" type polymers and such other type of block polymers should constitute less than 50 weight percent of the principal binder resin, block polymer previously described.

In the following table there is set forth advantageous range for constituents when optional materials are included.

| Material | Sacrificial Binders with Optional Constituents | | |
|---|---|---|---|
| | Range, Wt. % of Binders | Preferred Range Wt. % of Binder | Most Preferred Range, Wt. % of Binder |
| block polymer | 10–90 | 30–85 | 45–65 |
| plasticizer | 90–10 | 70–15 | 35–55 |
| oil | 0–90 | 0–70 | 0–55 |
| wax | 0–70 | 0–30 | 0–10 |
| secondary resin | 0–40 | 0–25 | 0–15 |
| secondary elastomer | 0–40 | 0–15 | 0–10 |
| antioxidants | 0–7 | 0–5 | 0–3 |
| process aids | 0–15 | 0–10 | 0–7 |

F. Definitions

The term "sintering" is used herein to mean the coalescence by heat of crystalline or amorphous particles into a solid mass.

The term "molding" is used herein to mean any of the methods of forming known in the art as extrusion molding, injection molding, compression molding, laminating which includes compression molding, transfer molding, pressure molding, displacement molding, blow molding, calendering, and embossing.

The term "processing" is used herein to mean mixing, forming, and mixing and forming.

The term "green body" is used herein to mean a molded article comprising an intimate mixture of sinterable particulate solids and a thermoplastic, organic binder.

The term "molecular weight" is used herein to mean number average molecular weight ($\overline{M}_n$).

The term "room temperature" is used herein to mean a temperature in the range of 20°–25° C.

The term "softening point" is used herein to mean the glass transition temperature when used with respect to glassy polymers and the crystalline melting point when used with respect to crystalline polymers.

The term "glass transition temperature" is signified herein by the symbol "$T_g$" and is used herein to mean that temperature below which a non-crystallizing polymer becomes a supercooled liquid, i.e., a glass.

The term "crystalline melting point" is signified herein by the symbol "$T_m$" and is used herein to mean that temperature at which a crystalline polymer melts and becomes non-crystalline.

Both "glass transition temperature" and "crystalline melting point" represent areas of transition but are practical terms which are sufficiently definitive and exact for the full and complete practice of this invention by one skilled in the art without experimentation beyond normal routine.

The term "glassy polymer" is used herein to mean a non-crystallizing polymer which at room temperature is below its glass transition temperature.

The term "rubbery polymer" is used herein to mean a non-crystalline polymer that is above its $T_g$ at room temperature.

The term "crystalline polymer" is used herein to mean a crystallizing polymer which is below its $T_m$ at room temperature.

The term "flexible polymer" is used herein to mean a polymer which at room temperature is in transition from glass or crystalline material to an elastomeric state, i.e., to a rubber.

It will be understood by those skilled in the art that it is possible for portions of a particular polymeric mass to exist in more than one state at room temperature and not be in a state of transition from one to the other, e.g., a polymeric mass in which one portion is a "rubbery polymer" as defined above and a second portion is a "crystalline polymer" as defined above. Thus, the defined term concerned shall be understood to mean that the largest fraction of such polymeric mass meets the limitations of the term used.

The following are illustrative examples wherein, unless otherwise specified, the materials used are within the limitations hereinbefore set forth for such materials in the practice of this invention.

EXAMPLE 1

An A—B—A block polymer elastomer, hereinafter called "the elastomer", is prepared by an anionic initiated polymerization using the basic high vacuum apparatus and general procedures for anionic polymerization described in section 2 (Experimental Techniques) of the aforecited article "Procedures for Homogeneous Anionic Polymerization", by L. J. Fetters. In addition, all attachments of the vessels to the vacuum line are accomplished through a grease trap as shown in the aforecited article "The Association of Polystyryllithium, Polyisoprenyllithium, and Polybutadienyllithium in Hydrocarbon Solvents" by M. Morton et al.

The reactor is first flamed while under vacuum. The reactor is cooled, sealed off from the vacuum line, and then rinsed with a solution of ethyllithium in n-hexane to react with any residual materials that could terminate the growing polymer chains. The monomers and solvents to be used in preparing the elastomer are purified according to the article by L. J. Fetters last mentioned above.

The reactor is reattached to the vacuum line. A solution containing 0.036 grams of ethyllithium in 3 ml. benzene is added to the reactor. To the reactor is charged 370 ml. of benzene. Styrene monomer in the amount of 15 grams is distilled into the reactor through a breakseal onto the top of the benzene. The contents are cooled to dry-ice/alcohol temperatures e.g., −65° C. to −78° C. The reactor is sealed off from the vacuum line and the contents allowed to warm-up from a dry-/ice alcohol temperature. As soon as the contents have thawed 0.65 grams of anisole in 4 ml. of benzene is added and shaken with the benzene styrene in the reactor. The polymerization of the styrene is allowed to proceed for 4 hours at 30° C. The reactor is then reattached to the vacuum line and 60 grams of butadiene is distilled in. After the contents have been cooled with liquid nitrogen, the reactor is sealed off from the vacuum line. The mixture is allowed to thaw and after stirring the polymerization of butadiene is allowed to proceed at 30° C. for 16 hours. The mixture is cooled to a dry-ice/alcohol temperature and 15 grams of styrene are distilled in after the reactor has been attached to the vacuum line. The reactor is once again sealed off from the vacuum line, the contents thawed and mixed, and polymerization of the styrene allowed to continue for 4 hours at 30° C. The elastomer in the reactor is then coagulated by slowly pouring the benzene solution into methanol containing a small amount of phenylbentanaphthylamine to stabilize the elastomer. The elastomer is dried and is then ready for use as the principal binder resin.

This polystyrene-polybutadiene-polystyrene elastomer containing about 33.3 wt. % polystyrene in the amount of 14.5 grams is banded on a tight mill which has been preheated to 300° F. About 10 grams, of 100 total grams, of glassy cordierite frit are then added on the mill to stabilize the band. The oil, 12.5 grams of a commercially available paraffinic petroleum oil, Flexon 845—a tradename of Exxon Company, U.S.A. is stirred with 50 grams of the cordierite frit. This oil has the following properties: specific gravity (60/60° F.) of 0.8649–0.8811; color (ASTM) of 1–4; viscosity (210° F.) of 43.4–61.5 S.U.S.; aniline point of 219°–240° F. and silica gel aromatics of 14.9–16.1 wt. %. About half of the oil/cordierite mixture is added to the mill and mixed in. As the viscosity of the mixture decreases, the mill temperature is reduced to 290° F. to minimize volatilization of the oil. The remainder of the dry cordierite and the remainder of the cordierite/oil mixture are mixed by alternately adding a few grams of one and then of the other to the material on the mill. When the mixing is complete in about 20–30 minutes, the composition is sheeted from the mill and allowed to cool.

Ribbed sheets of the mixture are prepared by compression molding. The sheet obtained from the above recited mixing is banded on a 290° F. mill and the nip width is decreased so that a sheet 0.030 inch thick is obtained. A preform 3½ inch square is cut from the 0.030 inch thick sheet, the same providing an excess of material for the ribbed mold being used. A press with a 3⅝ inch diameter ram and the bottom half of the mold are preheated to 250° F. The preform is then placed on the preheated bottom half of the mold for 15 seconds. The unheated top half of the mold is then placed upon the preform and the bottom half. Both halves of the mold are coated with polytetrafluoroethylene. The press is closed and a pressure of 2,000 psig is applied. This pressure is maintained for 15 seconds. The pressure is then released and the ribbed sheet removed from the mold.

The ribbed sheet is then heated in accordance with the following cycle:

Table I

| Step | Temperature, °F. | Time, Hrs. |
|---|---|---|
| 1 | 160 | 4 |
| 2 | 260 | 4 |
| 3 | 400–450 | 4 |

The resulting body is then fired in accordance with the following cycle:

Table II

| Step | Rate of Temperature Rise, °F./Hr. | Temperature Range °F. |
|---|---|---|
| 1 | 600–800 | room–2200 |
| 2 | 100 | 2200–2500 |

This results in a strong, dense, cordierite ribbed sheet.

EXAMPLE 2

The procedures of Example 1 are repeated with the single difference that the block polymer elastomer used is a commercially-available triblock (ABA) polymer having a polybutadiene center block and polystyrene end blocks. This block polymer contains 30 weight percent polystyrene, i.e., Kraton 1101. Kraton is a tradename of Shell Oil Company. This block polymer has specific gravity of about 0.95 and intrinsic viscosity of about 1.00 dl/g (30° C. in toluene).

This results in a strong, dense, cordierite ribbed sheet.

EXAMPLE 3

The procedures of Example 2 are repeated except for the difference that the elastomer, the oil and the frit are first stirred together and then mixed in a Banbury mixer which is preheated to 310° to 320° F. for 15 minutes. The resulting mixture is then banded on a two roll mill which has been preheated to 290° F. After two to five minutes of mill mixing, the composition is sheeted and allowed to cool. It is now ready for compression molding and is molded in accordance with the previous examples. This results in a strong, dense, cordierite sheet.

EXAMPLE 4

The procedures of Example 3 are repeated except for the following differences: twenty-nine (29.0) parts by weight of the polystyrene-polybutadiene-polystyrene triblock polymer elastomer are mixed with 27.3 parts by weight of paraffin wax (m.p. 130° F.), and 200 parts by weight of glassy cordierite frit. This results in a strong, dense, cordierite sheet. The paraffin wax acts as a process aid and plasticizer and provides smoother extrusions. It also increases the stiffness of the green body.

EXAMPLE 5

The procedures of Example 3 are repeated except for the following differences: test bars are molded using a ram type injection molding machine. The barrel and nozzle of the injection molding machine are preheated and controlled to 320° F. A mold for molding two test bars is preheated to 100° F. and clamped with a pressure of 15,000 psi. Twenty (20) grams of pieces cut from the above sheet are introduced into the barrel and allowed to heat for 5 minutes. The material is then injected into the mold with the ram pressure (800 psi) being maintained for one minute. Ram pressure is released followed by release of clamp pressure from the mold and the test bars are removed from the mold. The test bars are first heated and then fired using the same cycles used for the sheet material in the preceding examples. This results in strong, dense, cordierite bars.

EXAMPLE 6

The procedures of Example 2 are repeated except for the following differences: A flat sheet is prepared by use of a screw type extruder having a 2-inch bore. The binder cordierite mixture is pelletized and the pellets are fed into the hopper of the extruder. It is then conveyed through the extruder and passed through a thin slit die (0.020 inch thick, 4 inches wide). The temperature settings on the extruder are: feed section 175° F., transition section 250° F., and die section 300° F. The sheet is then cooled to room temperature and stored. The cooled sheet is flexible and suitable for subsequent handling such as slitting, rewinding and embossing and when fired yields a strong, dense, cordierite sheet.

EXAMPLE 7

The procedures of Example 2 are repeated with the exception that a different, commercially-available, polystyrene-polybutadiene-polystyrene, triblock polymer is used as the elastomer, i.e., Kraton 1102. This elastomer contains about 28% by weight polystyrene and has a lower viscosity, i.e., intrinsic viscosity of 0.84, dl/g (30° C. in toluene), than the one previously exemplified and identified by containing 30% by weight polystyrene. As a result of the lower viscosity of the elastomer, the binder composition has a lower viscosity and is more easily processed. The product obtained is not as stiff in the green state but still results in a strong, dense, cordierite ribbed sheet when fired.

EXAMPLE 8

The procedures of Example 2 are repeated with the single difference that a commercially-available, polystyrene-polyisoprene-polystyrene triblock polymer elastomer, i.e., Kraton 1107 containing about 14 weight percent polystyrene is used as the elastomer. When mixed with oil and frit, this elastomer yields a composition of lower modulus but of inferior strength in the green body state to those of the preceding examples. It still yields, however, a strong, dense, cordierite ribbed sheet after firing.

EXAMPLE 9

The procedures of Example 2 are repeated except for the differences: a commercially-available, triblock polymer elastomer having polystyrene end blocks and a poly(ethylene-butylene) rubber center and containing 12–14 weight percent polystyrene, i.e., Kraton GX7820, is used as the elastomer and a paraffinic oil, i.e., Shellflex 790, is substituted for the oil used in Example 2. Shellflex is a tradename of Shell Chemical Company. This change of oils is made to reduce the volatilization which would otherwise occur because of the higher mill temperatures best suited to work this plasticized elastomer, i.e., about 350° F. The green body is stiffer than that of Example 2 and a poorer dispersion of filler is obtained. The ribbed sheet obtained after firing is less dense and of lesser strength than those produced in the preceding examples.

EXAMPLE 10

The procedures of Example 2 are repeated except for the difference that the parts by weight of the elastomer, oil and cordierite frit are as follows: elastomer 2.75, oil 22.77 and frit 100.00. This example illustrates approaching toward minimum elastomer and maximum oil content in the binder. The green body is soft and lacking in strength and integrity. The ribbed sheet obtained after firing is less dense and of lesser strength than those produced in the preceding examples.

EXAMPLE 11

The procedures of Example 2 are repeated except for the difference that the parts by weight of the elastomer, oil and cordierite frit are as follows: elastomer 24.78, oil 2.53 and frit 100.00. This example illustrates approaching toward maximum elastomer and minimum oil content in the binder. This composition is stiffer and more difficult to process than those produced in the preceding examples.

EXAMPLE 12

The procedures of Example 2 are repeated except for the difference that paraffin wax (m.p. 130° F.) is substituted for the oil in the binder and the parts by weight of the elastomer, wax and frit are as follows: elastomer 8.26, wax 19.07, and frit 100.0. This composition results in a stiffer green body with less tendency to crack during burn-out and firing.

EXAMPLE 13

A commercially-available polystyrene in the amount of 12.17 grams is banded on a tight mill which has been preheated to 320° F. This polystyrene has specific gravity of about 1.05, a Vicat softening point of about 97° C., and a melt flow of about 3.5 grams/10 minutes (ASTM-D1238 condition G). The polystyrene-polybutadiene-polystyrene elastomer of Example 2 in the amount of 12.39 grams (30 weight percent polystyrene) is then combined on the mill with the polystyrene after the temperature is reduced to 310° F. for the remainder of the mixing. Two grams of the 100 grams of glassy cordierite frit to be used, are then added on the mill to stabilize the band. The paraffinic petroleum oil of Example 2 in the amount of 3.80 grams is stirred with 50 grams of the cordierite frit. About half of the oil/cordierite mixture is added to the mill and mixed in. The remainder of the dry cordierite and the cordierite/oil mixture are mixed in by alternating a few grams of one and then the other. When mixing is complete in about 20 to 25 minutes, the composition is sheeted from the mill and allowed to cool. The remainder of the processing is the same as in Example 2. This also results in a stiff green body but with improved green strength and better retention of shape during burn-out. The processability of the mix improved as mixing proceeded.

EXAMPLE 14

Natural rubber (#1 ribbed smoke sheet) in the amount of 10.67 grams is banded on a tight mill which has been preheated to 300° F. It is then removed from the mill and set aside. The elastomer of Example 2 in the amount of 13.77 grams is then banded on the 300° F. mill. Half of the natural rubber is then added to the mixture on the mill. The remainder of the dry cordierite and the natural rubber are then mixed in by alternating a few grams of one and then of the other. When mixing is complete in about 20–25 minutes, the composition is sheeted from the mill and allowed to cool. The remainder of the processing is the same as that of Example 2. The use of the natural rubber gives improved tear strength in the green body and gives a modulus lower than that in Example 2.

EXAMPLE 15

The procedures of Example 2 are repeated with the following changes: all of the cordierite is added in the first addition and none is mixed separately with the oil. In addition, the parts by weight of elastomer, oil and cordierite are as follows: elastomer 27.54, oil 25.30 and frit 2.72. This provides an extremely soft composition with a tendency to provide a porous ceramic part.

EXAMPLE 16

The procedures of Example 2 are repeated with the following changes: the parts by weight of elastomer, oil and frit are elastomer 12.39, oil 13.92 and frit 123.81. At this high loading of frit, the green body is very stiff but very weak and difficult to process.

EXAMPLE 17

The procedure of Example 2 is repeated with the following changes: the parts by weight of elastomer, oil and frit are elastomer 13.77, oil 12.53 and frit 100.00 In addition, the mixture also contains 0.14 parts by weight of an antioxidant, i.e., 4,4'-methylene bis(2,6-di-tert-butyl-phenol). Use of the antioxidant results in better retention of strength during mixing and improved resistance to slumping during binder burn-off.

EXAMPLE 18

The procedure of Example 2 is repeated with the following changes: the proportions by weight of the binder ingredients and frit are elastomer 13.77, oil 11.39, frit 100.00 and methylacetylricinoleate, a process aid, 1.36. Use of the process aid results in better processability during calendering and extrusion.

EXAMPLE 19

Sintered, modified, beta-alumina tubes are produced by extrusion molding using the elastomer and oil of Example 2, wax, an antioxidant and particulate beta-alumina. The composition mixed for molding is as follows:

Table I

| Material | Parts by Weight |
|---|---|
| Elastomer of Example 2 | 4.7 |
| Oil of Example 2 | 3.2 |
| Paraffic wax (m.p. 135° F.) | 3.5 |
| Antioxidant, poly 1,2-dihydro-2,24-trimethylquinoline | 0.5 |
| Powder lithium-modified beta-alumina (9.0% Na, 0.8% $Li_2O$ and 90.2% $Al_2O_3$) | 50.0 |

The above-listed materials are mixed at 310° F. (154° C.) on a two roll mill. After being extruded into tube shape using a 310° F. (154° C.) nozzle temperature with a barrel temperature of 340° F. (171° C.), the tubes are then burned-out and sintered using the following schedule:

Table II

| Step | Rate of Temp. Rise °C./Hr. | Temperature Range, °C. |
| --- | --- | --- |
| 1 | 50 | 100 – 700 |
| 2 | Hold for 15 hrs. | 700 |
| 3 | Cool to room temperature over 3 hours | |

Each such tube is placed in a platinum tube which is mechanically sealed. The sealed sample is then placed in a furnace. The furnace is heated to 1100° C. over 15 hours. From 1100° C., the furnace is heated to 1570° C. over 4 hours and 45 minutes where it is held for 15 minutes and then cooled to 1420° C. over 15 minutes. The sample is held at 1420° C. for 8 hours and then cooled to 360° C. over 7 hours at which point the sample is allowed to cool to ambient temperature in air.

EXAMPLE 20

The procedures of the previous examples are repeated with the single difference that particulate alumina is substituted for the cordierite and sintering is carried out at temperatures of 1600°–1700° C.

EXAMPLE 21

The procedures of the previous examples are repeated with the single difference that particulate silicon carbide is substituted for the cordierite, and sintering is carried out at temperatures of 2000°–2200° C.

EXAMPLE 22

The procedures of the previous examples are repeated except that particulate aluminum is substituted for the cordierite and sintering is carried out at temperatures of 550°–650° C.

EXAMPLE 23

The procedures of the previous examples are repeated except that particulate stainless steel is substituted for the cordierite and sintering is carried out at temperatures of 1400°–1500° C.

EXAMPLE 24

The procedures of the previous examples are repeated with fibers having a length to diameter ratio exceeding 8 (4D>8) of the respective material used to replace powders of such materials in those examples using powders.

EXAMPLE 25

The procedures of Example 2 are repeated with the following changes: the parts by weight of the binder ingredients and frit are elastomer 84.6 and frit 34.5. No attempt is made to prepare ribbed sheet or to prepare a strong, dense cordierite body. The purpose of preparing this composition is to determine if the minimum in viscosity as a function of temperature is an inherent feature of the processing characteristics of the block polymer elastomer based binder compositions. When the processing characteristics of the mixed composition are examined using a capillary rheometer, the viscosity initially decreases with increase in temperature and then increases with increase in temperature. The minimum in viscosity for this composition occurs at about 220° C. It is expected that the particular temperature at which a minimum in viscosity occurs will vary from composition to composition and be dependent on the specific ingredients and their proportions in a particular composition.

The foregoing examples are merely illustrative of the practice of this invention and those skilled in the art will readily recognize that modifications and variations may be made in these examples without departing from the scope of this invention as set forth in the appended claims.

What is claimed is:

1. The method of making a sinterable molding of particulate sinterable particles which comprises mixing about 30 to about 70 volume percent of sinterable particulate solids with about 70 to about 30 volume percent of an organic sacrificial binder which comprises an intimate mixture of about 10 to about 90 parts by weight of resinous material and about 90 to about 10 parts by weight of a plasticizer for said resinous material wherein (1) said resinous material is a block polymer having the structural formula AB —AB—$_\eta$ A, wherein "$\eta$" is 0 or a positive integer, "A" is a linear or branched polymer that is glassy or crystalline at 20°–25° C., has its softening point in the range of about 80° to about 250° C. and "B" is a polymer different than A that behaves as an elastomer at temperatures between about 15° C. below the softening point of A and about 100° C. above the softening point of A, and (2) said plasticizer is selected from the group consisting of
  (a) an oil at least 75 percent by weight of which boils in the range of about 550° F. to about 1038° F., has viscosity at 210° F. in the range of about 30 to about 220 Saybolt Universal Seconds and an aniline point in the range of about 170° F. to about 255° F.
  (b) a wax melting at a temperature in the range of about 130° F. to about 170° F. at least 75 percent by weight of which boils at temperatures in the range of about 600° F. to about 900° F., and (c) an oil in accordance with (a) and a wax in accordance with (b)

and wherein 0 to between 49 and 50 weight percent of said block polymer is replaced by a first replacement polymer meeting the limitations of polymer "A" in said structural formula, and 0 to between 49 and 50 weight percent of said block polymer is replaced with a second replacement polymer meeting the limitations of polymer "B" in said structural formula, except that said second replacement polymer behaves as an elastomer at temperatures between about 5° C. below the softening point of "A" of said block polymer and about 90° C. above the softening point of "A" of said block polymer, the sum of said replacements of said block polymer comprising less than 50 weight percent of said block polymer, molding the resultant mixture, driving off said sacrificial binder from said mixture with heat and sintering said particulate solids of said mixture.

2. A method in accordance with claim 1 wherein "B" of said block polymer behaves as an elastomer at temperatures between about 15° C. below the softening point of "A" of said block polymer and about 70° C. above the softening point of "A" of said block polymer.

3. The method in accordance with claim 1 wherein the mixing is conducted in a temperature range not exceeding 15° C. above that temperature at which viscosity is at a maximum.

4. The method in accordance with claim 1 wherein the mixing is conducted in a temperature range up to that temperature at which viscosity increases.

5. The method of making a sinterable molding of particulate sinterable particles which comprises mixing about 30 to about 70 volume percent of sinterable particulate solids with about 70 to about 30 volume percent of an organic sacrificial binder which comprises an intimate mixture of about 10 to about 90 parts by weight of resinous material and about 90 to about 10 parts by weight of a plasticizer for said resinous material wherein
(1) said resinous material is a block polymer having the structural formula AB —AB—$_\eta$ A, wherein "$\eta$" is 0 or a positive integer, "A" is a linear or branched polymer that is glassy or crystalline at 20°–25° C., has its softening point in the range of about 80° to about 250° C. and "B" is a polymer different than A that behaves as an elastomer at temperatures between about 15° C. below the softening point of A and about 100° C. above the softening point of A, and
(2) said plasticizer is selected from the group consisting of
(a) an oil at least 75 percent by weight of which boils in the range of about 550° F. to about 1038° F., has viscosity at 210° F. in the range of about 30 to about 220 Saybolt Universal Seconds and an aniline point in the range of about 170° F. to about 255° F. (b) a wax melting at a temperature in the range of about 130° F. to about 170° F. at least 75 percent by weight of which boils at temperatures in the range of about 600° F. to about 900° F., and (c) an oil in accordance with (a) and a wax in accordance with (b)

and wherein 0 to between 49 and 50 weight percent of said block polymer is replaced by a first replacement polymer meeting the limitations of polymer "A" in said structural formula, 0 to between 49 and 50 weight percent of said block polymer is replaced with a second replacement polymer meeting the limitations of polymer "B" in said structural formula, and 0 to between 49 and 50 weight percent of said block polymer is replaced with an elastomer polymer having the structural formula X—B (AB)$\eta$ A—$\eta'$, wherein "$\eta$" is 0 or a positive integer "$\eta'$" is a positive integer greater than 2, and X is a linking group, "A" or "B", "A" and "B" have the same limitations as A and B of said block polymer except that "B" of said elastomer polymer behaves as an elastomer at temperatures between about 5° C. below the softening point of "A" of said block polymer and about 90° C. above the softening point of "A" of said block polymer, the sum of said replacements of said block polymer comprising less than 50 weight percent of said block polymer, molding the resultant mixture, driving off said sacrificial binder with heat and sintering said particulate solids of said mixture.

6. A method in accordance with claim 5 wherein "B" of said block polymer behaves as an elastomer at temperatures between about 15° C. below the softening point of "A" of said block polymer and about 70° C. above the softening point of "A" of said block polymer and "B" of said elastomer polymer behaves as an elastomer at temperatures between about 5° C. below the softening point of "A" of said block polymer and about 70° C. above the softening point of said block polymer.

7. A method in accordance with claim 5 wherein 0.1 to 30 weight percent of said block polymer is replaced with an equivalent amount of said first replacement polymer meeting the limitations of polymer "A".

8. A method in accordance with claim 5 wherein 0.1 to 30 weight percent of said block polymer is replaced with an equivalent amount of said second replacement polymer meeting the limitations of polymer "B".

9. A method in accordance with claim 5 wherein 0.1 to 40.0 weight percent of said block polymer is replaced with an equivalent amount of said elastomer polymer.

10. The method in accordance with claim 5 wherein the mixing is conducted in a temperature range not exceeding 15° C. above that temperature at which viscosity is at a minimum.

11. The method in accordance with claim 5 wherein the mixing is conducted in a temperature range up to that temperature at which viscosity increases.

* * * * *